Jan. 7, 1958   G. H. SIMMONDS ET AL   2,818,905
ELECTRIC CABLES
Filed Jan. 4, 1956

Inventor
G. H. Simmonds
H. O. Stewart
By
Webb Mackey & Burden
Attorney

United States Patent Office 2,818,905
Patented Jan. 7, 1958

2,818,905

ELECTRIC CABLES

George Herbert Simmonds, Erith, and Hector David Stewart, Bexleyheath, England, assignors to British Insulated Callender's Cables Limited, London, England, a British company Application January 4, 1956, Serial No. 557,401

Claims priority, application Great Britain January 12, 1955

8 Claims. (Cl. 154—2.25)

This invention relates to the manufacture of electric cables which are capable of carrying large currents, are sufficiently flexible to permit frequent coiling and uncoiling and are capable of floating on water. More particularly it relates to such water-buoyant cables comprising a central flexible cellular core, a conductor formed of a large number of wires laid helically around the core and a covering over the conductor. In buoyant cables of this kind the covering is generally an insulating and waterexcluding covering and such cables are described and claimed in the specification of Letters Patent No. 2,518,323 but where buoyant cable or a part of the length thereof is required to serve as a buoyant electrode, the covering may be a water-pervious covering or an electrically conductive covering.

In cables of the kinds described above, the central core provides the buoyancy and accordingly must have an average density substantially less than that of water. Hitherto it has been the practice to make the central core a composite structure comprising soft flexible members and relatively rigid members, the former serving to ensure flexibility of the core and the latter serving to give it the necessary strength against radial compression both during the manufacture of the cable and when the cable is in service. It has been a necessary or convenient practice to attach the hard and soft elements of the core together so as to make up a long flexible member which can be fed into the stranding machine by which the wires of the conductor are laid helically around the core.

The present invention provides a method of manufacturing a core for a buoyant cable which avoids the need to assemble and connect together large numbers of hard elements and of soft elements in order to obtain both flexibility and radial strength.

In accordance with our invention we form the core by assembling together a number of long rods of expanded polyethylene, enclosing the assembly within an envelope and temporarily raising the temperature of the assembly to a temperature sufficiently high to ensure the permanent expansion of the rods to an extent substantially to fill the interstices between them and between them and their envelope and the welding together of their contiguous surfaces but not so high as to destroy their cellular structure.

As a result of such heating the assembly of expanded polyethylene rods becomes converted into a single cellular member of which the relative density is lower than the relative density of the individual rods.

The temperature required to effect the expansion and welding together of the rods varies with the particular expanded polyethylene used, being in some cases less than the melting point of the polyethylene and in some cases higher, the optimum temperature being readily determinable experimentally in each case. Factors affecting the temperature are the nature of the blowing agent used, the interval between the manufacture of the expanded polyethylene rods and the heating of the assembly to cause further expansion of the polyethylene, and the size and uniformity of the cell structure of the expanded rods. We prefer to use a temperature above the melting point of the polyethylene since we find that in this way we can obtain cores of lower density. Our preferred blowing agent is p-p' oxybis-benzene sulphonyl hydrazide which blows between 130° C. and 150° C.

The rods of expanded polyethylene may be assembled together to form a group of rods extending longitudinally parallel to the axis of the group or a number of rods may be laid up helically together or be laid up helically in one or more layers about a core of expanded polyethylene or other material. Initially the rods are preferably but not necessarily of circular cross-section. They are preferably formed in a known manner by extruding polyethylene in which a blowing agent has been incorporated, the rods are preferably extruded in lengths corresponding to or greater than the length of buoyant cablelength required but shorter lengths may be used.

The envelope in which the assembly of rods of expanded polyethylene is heated preferably forms a permanent part of the complete cable. It may consist of or comprise one or more helical lappings of tape or it may be constituted by the conductor itself, or by both. An example of a satisfactory form of envelope is one obtained by applying to the group of rods of expanded polyethylene a layer of two tapes of terylene or nylon, each applied with a small gap between successive turns. The terylene or nylon tapes form a bedding layer for the surrounding conductor and eliminate or reduce the risk of the conductors bedding into the expanded polyethylene when in a temporarily softened state.

The heating of the assembly of rods may take place before or after the application of the conductor wires. Where the cable is to be provided with a water-proof covering of vulcanised rubber or other material necessitating a vulcanising or other heat treatment, such heat treatment may also serve to bring about the required softening and welding together of the rods. In any case such vulcanising or other treatment when undertaken will, by appropriate choice of vulcanisation accelerators or otherwise, be carried out at a temperature appropriate to that required to effect the welding together of the rods of expanded polyethylene without loss of cellular structure.

Examples of the manufacture of buoyant cables in accordance with the invention will hereinafter be described with reference to the accompanying drawings in which Figure 1 shows a step in the manufacture of the core and Figure 2 is a cross-section of the finished cable.

The first step in the manufacturing process is the manufacture of a number of rods of expanded polyethylene of a length equal to or greater than the length of cable to be manufactured. These rods are made by compounding polyethtylene with .058% to 2%, preferably 1%, of p-p'-oxy-bis-benzene sulphonyl hydrazide and extruding the mixture at approximately 150° C. under strictly controlled temperature conditions to lower the density of the polyethylene to about 0.36.

Eighteen lengths of the rod, which each have a diameter of 0.35 inch, are then laid up helically about a centre rod of similar material, size and shape to form inner and outer layers of six and twelve rods respectively. Over the assembly two terylene tapes, each having a thickness of 0.008 inch and a width of 1½ inches, are helically lapped with a 0.1 inch gap, the outer breaking joint with the inner.

At this stage one of two alternative procedures can be followed. In accordance with the first procedure the assembly thus formed is heated to 125° C. and kept at this temperature for two hours to convert the rods into a single cylindrical member of a density of approximately .33.

The core thus formed is then provided with a conductor and an insulating water-excluding covering.

In accordance with the second procedure, over the bedding layer formed by the terylene tapes, 120 copper wires of 0.040 inch diameter are stranded to form two layers, one applied with a left hand lay and the other with a right hand lay. Over the stranded conductor four tapes of an unvulcanised rubber composition which cures at a temperature of 125° C. are lapped to form an insulating and water-excluding covering having a wall thickness of 0.15 inch. After heating the cable to the curing temperature in 2 hours and maintaining it at that temperature for 2 hours to complete vulcanisation, it is found that, without any substantial breakdown of the closed cell structure of the expanded polyethylene, the rods have expanded to fill the inter-rod spaces and the spaces between the outer rods and the terylene tape envelope enclosing them and have become united to form a single multicellular body having a relative density of 0.33.

We prefer to use the second procedure since if the first procedure is used the water-excluding covering must be applied without again raising the temperature of the core as such a second heating would modify or destroy the cellular structure.

Figure 1:
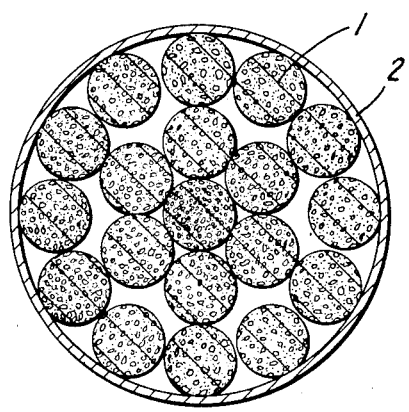
Figure 1 shows in cross-section the core of the cable before the polyethylene rods have been finally expanded. The rods 1 are surrounded by an envelope 2 consisting of the two terylene tapes.
Figure 2:
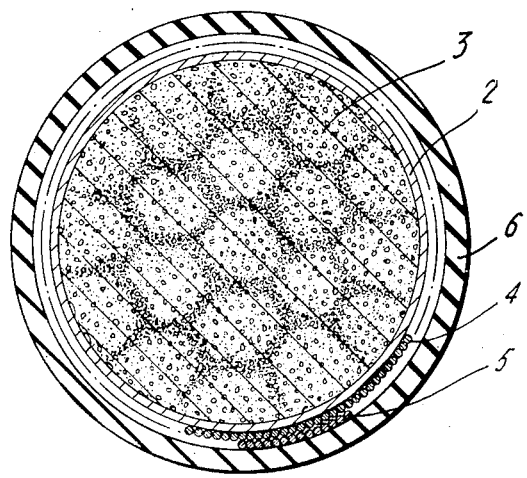
Figure 2 is a cross-section of the completed cable made by either of the procedures described.

Referring to Figure 2 it will be seen that the rods 1 of Figure 1 have expanded to form a single cylindrical member 3. Over the envelope 2 there are two layers 4 and 5 of copper wires and over the layer 5 is a sheath 6 of rubber.

Many other blowing agents are available which blow at temperatures between that at which the polyethylene first begins to soften sufficiently to be capable of expanding to cellular form and that at which the cellular form would be destroyed. It is preferable to use an agent which blows within the range 100°–160° C.

What we claim as our invention is:

1. The method of manufacturing a core for a buoyant cable which comprises extruding polyethylene in which a blowing agent has been incorporated to form a plurality of long rods of expanded polyethylene, assembling the rods together side by side, enclosing the assembly within an envelope having an internal diameter substantially equal to the diameter of the assembly and temporarily raising the assembly to a temperature sufficiently high to ensure the permanent expansion of the rods to an extent substantially to fill the interstices between them and their envelope and the welding together of their contiguous surfaces to form an integral structure but not so high as to destroy their cellular structure.

2. The method of manufacturing a buoyant cable which comprises extruding polyethylene in which a blowing agent has been incorporated to form long rods of expanded polyethylene, assembling a plurality of the rods together side by side, enclosing the assembly within an annular conductor having an internal diameter substantially equal to the diameter of the assembly and temporarily raising the assembly to a temperature sufficiently high to ensure the permanent expansion of the rods to an extent substantially to fill the interstices between them and their enclosure and the welding together of their contiguous surfaces to form an integral structure but not so high as to destroy their cellular structure.

3. The method of manufacturing a buoyant cable which comprises extruding polyethylene in which a blowing agent has been incorporated to form long rods of expanded polyethylene, assembling a plurality of the rods together side by side, enclosing the assembly within a close fitting envelope, applying conductor wires to the envelope to build up an annular conductor surrounding it, surrounding the conductor with a layer of a vulcanisable rubber compound, which will vulcanise at a temperature sufficiently high to ensure the permanent expansion of the rods to an extent substantially to fill the interstices between them and their envelope and the welding together of their contiguous surfaces to form an integral structure but not so high as to destroy their cellular structure, and raising the assembly to said temperature to vulcanise the rubber compound and effect the desired expansion and welding together of the polyethylene rods.

4. The method of manufacturing a core for a buoyant cable which comprises extruding polyethylene in which a blowing agent has been incorporated to form a plurality of long rods of expanded polyethylene, assembling the rods together side by side, helically lapping at least one tape of insulating material around the assembly to form an envelope for the assembly, and temporarily raising the assembly to a temperature sufficiently high to ensure the permanent expansion of the rods to an extent substantially to fill the interstices between them and their envelope and the welding together of their contiguous surfaces to form an integral structure but not so high as to destroy their cellular structure.

5. The method of manufacturing a buoyant cable which comprises extruding polyethylene in which a blowing agent has been incorporated to form a plurality of long rods of expanded polyethylene, assembling the rods together side by side, helically lapping at least one tape of insulating material around the assembly to form an envelope for the assembly, enclosing the assembly within an annular conductor and temporarily raising the assembly to a temperature sufficiently high to ensure the permanent expansion of the rods to an extent substantially to fill the interstices between them and their enclosure and the welding together of their contiguous surfaces to form an integral structure but not so high as to destroy their cellular structure.

6. The method of manufacturing a core for a buoyant cable which comprises extruding polyethylene in which a blowing agent has been incorporated to form long rods of expanded polyethylene, laying up a plurality of the rods helically together to form an elongated substantially cylindrical assembly, enclosing the assembly within an envelope having an internal diameter substantially equal to the diameter of the assembly and temporarily raising the assembly to a temperature sufficiently high to ensure the permanent expansion of the rods to an extent substantially to fill the interstices between them and their envelope and the welding together of their contiguous surfaces to form an integral structure but not so high as to destroy their cellular structure.

7. The method of manufacturing a buoyant cable which comprises extruding polyethylene in which a blowing agent has been incorporated to form long rods of expanded polyethylene, laying up a plurality of the rods helically together to form an elongated substantially cylindrical assembly, enclosing the assembly within an annular conductor having an internal diameter substantially equal to the diameter of the assembly and temporarily raising the assembly to a temperature sufficiently high to ensure the permanent expansion of the rods to an extent substantially to fill the interstices between them and their enclosure and the welding together of their contiguous surfaces to form an integral structure but not so high as to destroy their cellular structure.

8. The method of manufacturing a buoyant cable which comprises extruding polyethylene in which a blowing agent has been incorporated to form long rods of expanded polyethylene, laying up a plurality of the rods helically together to form an elongated substantially cylindrical assembly, enclosing the assembly within a close fitting envelope, applying conductor wires to the envelope to build up an annular conductor surrounding it, surrounding the conductor with a layer of a vulcanisable rubber compound which will vulcanise at a temperature sufficiently high to ensure the permanent expansion of the rods to an extent substantially to fill the interstices between them and their envelope and the welding together of their contiguous surfaces to form an integral structure but not so high as to destroy their cellular structure, and raising the assembly to said temperature to vulcanise the rubber compound and effect the desired expansion and welding together of the polyethylene rods.

References Cited in the file of this patent

UNITED STATES PATENTS

| | | |
|---|---|---|
| 2,403,693 | Urmston | July 9, 1946 |
| 2,404,239 | MacDonald | July 16, 1946 |
| 2,428,480 | Tunstall | Oct. 7, 1947 |
| 2,466,271 | Pfleumer | Apr. 5, 1949 |
| 2,518,323 | Hunter | Aug. 8, 1950 |
| 2,518,454 | Elliott | Aug. 15, 1950 |